US009218599B1

(12) United States Patent
Hilbring

(10) Patent No.: US 9,218,599 B1
(45) Date of Patent: Dec. 22, 2015

(54) METHOD AND SYSTEM FOR AUTOMATIC CHARGEBACK REIMBURSEMENT FOR PRODUCT RETURNS

(71) Applicant: MasterCard International Incorporated, Purchase, NY (US)

(72) Inventor: Christophe Lois Hilbring, St-Denis (BE)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 0 days.

(21) Appl. No.: 14/457,614

(22) Filed: Aug. 12, 2014

(51) Int. Cl.
*G06Q 40/00* (2012.01)
*G06Q 20/40* (2012.01)

(52) U.S. Cl.
CPC .................... *G06Q 20/407* (2013.01)

(58) Field of Classification Search
CPC ...................................................... G06Q 20/10
USPC ......................................................... 235/379
See application file for complete search history.

(56) References Cited

U.S. PATENT DOCUMENTS

| | | | |
|---|---|---|---|
| 5,787,404 A | 7/1998 | Fernandez-Holmann | |
| 7,311,249 B2 * | 12/2007 | Smith et al. | 235/383 |
| 7,359,866 B2 | 4/2008 | Farat | |
| 7,661,586 B2 | 2/2010 | Robbins, Jr. et al. | |
| 7,857,205 B2 | 12/2010 | Hoffman et al. | |
| 8,527,416 B2 | 9/2013 | Flitcroft et al. | |
| 2003/0171993 A1 | 9/2003 | Chappuis | |
| 2010/0088207 A1 | 4/2010 | McLaughlin et al. | |

OTHER PUBLICATIONS

"Commonwealth Bank ramps up security for online shopping" Commonwealth Bank Group, https://www.commbank.com.au/about-us/news/media-releases/2010/300810-news-security-online-shopping.html; 3 pages.

* cited by examiner

*Primary Examiner* — Jamara Franklin
(74) *Attorney, Agent, or Firm* — Buchanan, Ingersoll & Rooney PC

(57) ABSTRACT

A method for processing an automatic chargeback request includes: storing, in an account database, a plurality of account profiles, wherein each account profile includes data related to a payment account including at least an account identifier; receiving, by a receiving device, an indication of a product return, wherein the indication includes at least a specific account identifier, a product amount, and a merchant identifier; identifying, in the account database, a specific account profile where the included account identifier corresponds to the specific account identifier; generating, by a processing device, a chargeback request for a chargeback to be initiated against a merchant associated with the merchant identifier for the product amount for benefit to the payment account related to the specific account profile; and transmitting, by a transmitting device, the generated chargeback request.

30 Claims, 7 Drawing Sheets

METHOD AND SYSTEM FOR AUTOMATIC CHARGEBACK REIMBURSEMENT FOR PRODUCT RETURNS

FIELD

The present disclosure relates to the processing of automatic chargeback requests, specifically the automatic generating and transmitting of a chargeback request to reimburse a consumer upon the return of a purchased product to a merchant.

BACKGROUND

Consumers often engage in payment transactions with merchants for the purchase of goods or services. Ideally, such transactions result in a benefit to both parties: consumers receive the transacted-for goods or services, and merchants receive money or some other benefit in exchange. However, in some instances consumers may be unhappy with the goods or services received. For example, a consumer may discover that a purchased product is broken or defective, is an incorrect color or size, or is otherwise not as advertised or presented by the merchant, or is unwanted for another reason. In such instances, the consumer may desire some form of compensation to make up for the problem with the purchased item.

In many situations, consumers may have two potential courses of action to take when they are unsatisfied with a purchase. The first is that a consumer may return the product to the merchant and request reimbursement for the purchase. In such a situation, the merchant may examine the returned merchandise and, if satisfied, return the purchase amount to the consumer. However, some merchants may only refund the amount to a gift card used only at the merchant, provide in-store credit to the consumer, or place a hold on providing the refund to a payment card used to make the purchase. Such methods may leave the consumer unfulfilled, by either not timely receiving their money when they return the product, or by being forced to continue to still spend their money at the merchant, especially if they return was for reasons related to the merchant's service.

The second course of action is that the consumer may contact their issuer and initiate a chargeback. In a chargeback, the issuer of the payment account used to fund the transaction reverses the transaction and credits their account, and then submits a chargeback request to the merchant to receive the money for the transaction. Chargebacks may be advantageous over returns for consumers as the consumers may receive their money immediately, and may also not be restricted to a gift card or in-store credit that can only be used at the merchant. However, chargebacks often require significant steps to be performed by the consumer to be initiated. Many issuers require the consumer to submit a formal request for a chargeback, including providing detail as to the transaction and the nature of the request for a chargeback, such as by describing the deficiencies of a product that has left the consumer unsatisfied. In addition, chargebacks often place the burden of proof on the merchant in disputing a chargeback. As a result, consumers may request a chargeback and cite a defective product, even when the product is not defective, and the merchant may be unable to provide sufficient evidence of the non-defective product. This could result in a loss of both merchandise and money for the merchant.

Thus, there is a need to provide a technical system that can more easily initiate chargebacks with merchants while also protecting the merchants involved by processing chargebacks only in instances where products are to be returned.

SUMMARY

The present disclosure provides a description of systems and methods for processing automatic chargeback requests.

A method for processing an automatic chargeback request includes: storing, in an account database, a plurality of account profiles, wherein each account profile includes data related to a payment account including at least an account identifier; receiving, by a receiving device, an indication of a product return, wherein the indication includes at least a specific account identifier, a product amount, and a merchant identifier; identifying, in the account database, a specific account profile where the included account identifier corresponds to the specific account identifier; generating, by a processing device, a chargeback request for a chargeback to be initiated against a merchant associated with the merchant identifier for the product amount for benefit to the payment account related to the specific account profile; and transmitting, by a transmitting device, the generated chargeback request.

A method for processing an automatic chargeback request includes: storing, in an account database, a plurality of account profiles, wherein each account profile includes data related to a payment account including at least an account identifier; storing, in a transaction database, a plurality of transaction data entries, wherein each transaction data entry includes data related to a payment transaction including at least a transaction identifier, a merchant identifier, and a funding account identifier; receiving, by a receiving device, an indication of a product return, wherein the indication includes at least a specific transaction identifier; identifying, in the transaction database, a specific transaction data entry where the included transaction identifier corresponds to the specific transaction identifier; identifying, in the account database, a specific account profile where the included account identifier corresponds to the funding account identifier included in the identified specific transaction data entry; generating, by a processing device, a chargeback request for a chargeback to be initiated against a merchant associated with the merchant identifier included in the identified specific transaction data entry for a product amount for benefit to the payment account related to the specific account profile; and transmitting, by a transmitting device, the generated chargeback request.

A system for processing an automatic chargeback request includes an account database, a receiving device, a processing device, and a transmitting device. The account database is configured to store a plurality of account profiles, wherein each account profile includes data related to a payment account including at least an account identifier. The receiving device is configured to receive an indication of a product return, wherein the indication includes at least a specific account identifier, a product amount, and a merchant identifier. The processing device is configured to: identify, in the account database, a specific account profile where the included account identifier corresponds to the specific account identifier; and generate a chargeback request for a chargeback to be initiated against a merchant associated with the merchant identifier for the product amount for benefit to the payment account related to the specific account profile. The transmitting device is configured to transmit the generated chargeback request.

A system for processing an automatic chargeback request includes an account database, a transaction database, a receiving device, a processing device, and a transmitting device.

The account database is configured to store a plurality of account profiles, wherein each account profile includes data related to a payment account including at least an account identifier. The transaction database is configured to store a plurality of transaction data entries, wherein each transaction data entry includes data related to a payment transaction including at least a transaction identifier, a merchant identifier, and a funding account identifier. The receiving device is configured to receive an indication of a product return, wherein the indication includes at least a specific transaction identifier. The processing device is configured to: identify, in the transaction database, a specific transaction data entry where the included transaction identifier corresponds to the specific transaction identifier; identify, in the account database, a specific account profile where the included account identifier corresponds to the funding account identifier included in the identified specific transaction data entry; and generate a chargeback request for a chargeback to be initiated against a merchant associated with the merchant identifier included in the identified specific transaction data entry for a product amount for benefit to the payment account related to the specific account profile. The transmitting device is configured to transmit the generated chargeback request.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Figure 1:
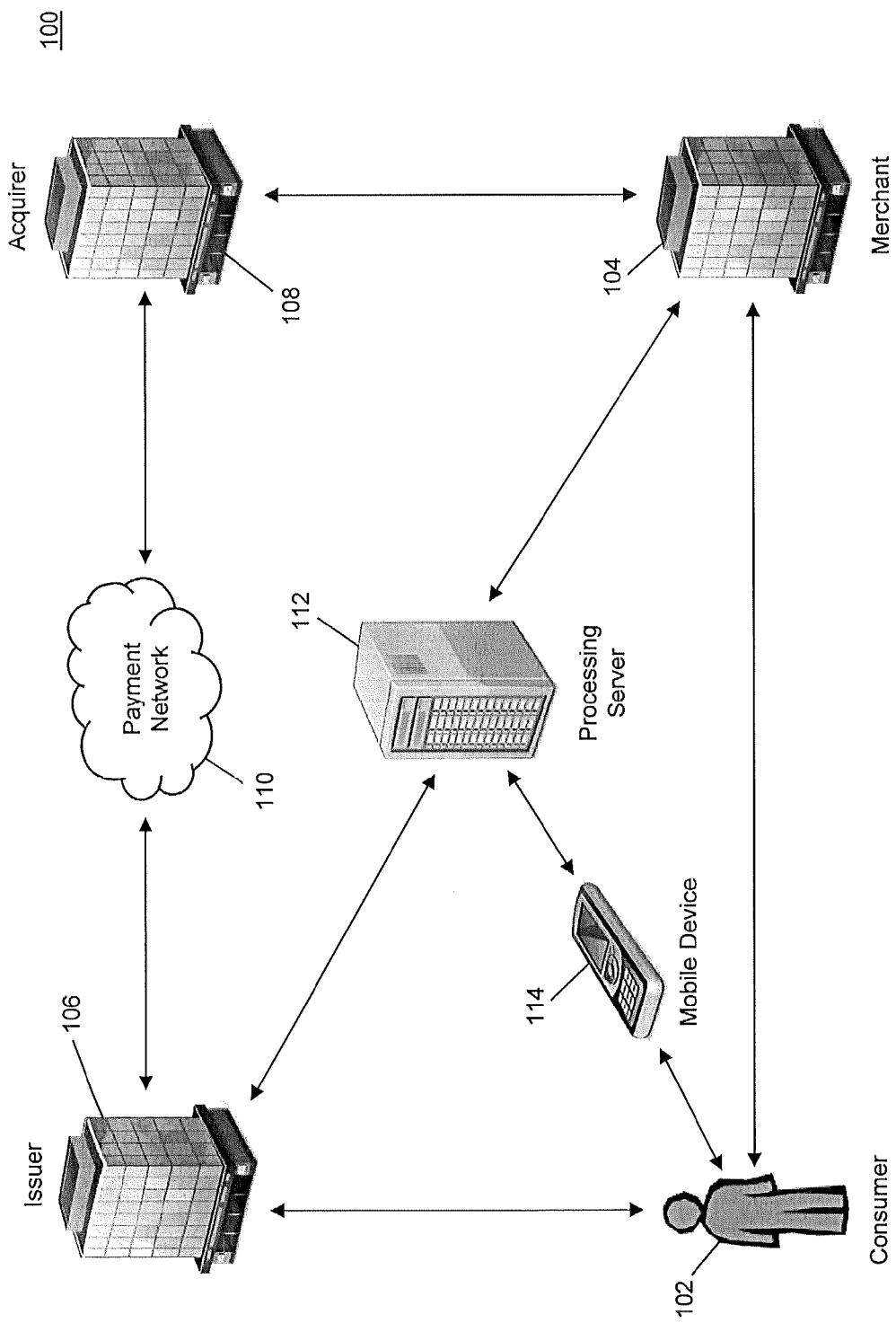
FIG. 1 is a high level architecture illustrating a system for processing automatic chargeback requests in accordance with exemplary embodiments.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Definition of Terms

Payment Network—A system or network used for the transfer of money via the use of cash-substitutes. Payment networks may use a variety of different protocols and procedures in order to process the transfer of money for various types of transactions. Transactions that may be performed via a payment network may include product or service purchases, credit purchases, debit transactions, fund transfers, account withdrawals, etc. Payment networks may be configured to perform transactions via cash-substitutes, which may include payment cards, letters of credit, checks, financial accounts, etc. Examples of networks or systems configured to perform as payment networks include those operated by MasterCard®, VISA®, Discover®, American Express®, PayPal®, etc.

Payment Account—A financial account that may be used to fund a transaction, such as a checking account, savings account, credit account, virtual payment account, etc. A payment account may be associated with an entity, which may include a person, family, company, corporation, governmental entity, etc. In some instances, a payment account may be virtual, such as those accounts operated by PayPal®, etc.

Payment Card—A card or data associated with a payment account that may be provided to a merchant in order to fund a financial transaction via the associated payment account. Payment cards may include credit cards, debit cards, charge cards, stored-value cards, prepaid cards, fleet cards, virtual payment numbers, virtual card numbers, controlled payment numbers, etc. A payment card may be a physical card that may be provided to a merchant, or may be data representing the associated payment account (e.g., as stored in a communication device, such as a smart phone or computer). For example, in some instances, data including a payment account number may be considered a payment card for the processing of a transaction funded by the associated payment account. In some instances, a check may be considered a payment card where applicable.

Merchant—An entity that provides products (e.g., goods and/or services) for purchase by another entity, such as a consumer or another merchant. A merchant may be a consumer, a retailer, a wholesaler, a manufacturer, or any other type of entity that may provide products for purchase as will be apparent to persons having skill in the relevant art. In some instances, a merchant may have special knowledge in the goods and/or services provided for purchase. In other instances, a merchant may not have or require and special knowledge in offered products. In some embodiments, an entity involved in a single transaction may be considered a merchant.

Issuer—An entity that establishes (e.g., opens) a letter or line of credit in favor of a beneficiary, and honors drafts drawn by the beneficiary against the amount specified in the letter or line of credit. In many instances, the issuer may be a bank or other financial institution authorized to open lines of credit. In some instances, any entity that may extend a line of credit to a beneficiary may be considered an issuer. The line of credit opened by the issuer may be represented in the form of a payment account, and may be drawn on by the beneficiary via the use of a payment card. An issuer may also offer additional types of payment accounts to consumers as will be apparent to persons having skill in the relevant art, such as debit accounts, prepaid accounts, electronic wallet accounts, savings accounts, checking accounts, etc., and may provide consumers with physical or non-physical means for accessing and/or utilizing such an account, such as debit cards, prepaid cards, automated teller machine cards, electronic wallets, checks, etc.

Acquirer—An entity that may process payment card transactions on behalf of a merchant. The acquirer may be a bank or other financial institution authorized to process payment card transactions on a merchant's behalf. In many instances, the acquirer may open a line of credit with the merchant acting as a beneficiary. The acquirer may exchange funds with an issuer in instances where a consumer, which may be a beneficiary to a line of credit offered by the issuer, transacts via a payment card with a merchant that is represented by the acquirer.

Payment Transaction—A transaction between two entities in which money or other financial benefit is exchanged from one entity to the other. The payment transaction may be a transfer of funds, for the purchase of goods or services, for the repayment of debt, or for any other exchange of financial benefit as will be apparent to persons having skill in the relevant art. In some instances, payment transaction may refer to transactions funded via a payment card and/or payment account, such as credit card transactions. Such payment transactions may be processed via an issuer, payment network, and acquirer. The process for processing such a payment transaction may include at least one of authorization, batching, clearing, settlement, and funding. Authorization may include the furnishing of payment details by the consumer to a merchant, the submitting of transaction details (e.g., including the payment details) from the merchant to their acquirer, and the verification of payment details with the issuer of the consumer's payment account used to fund the transaction. Batching may refer to the storing of an authorized transaction in a batch with other authorized transactions for distribution to an acquirer. Clearing may include the sending of batched transactions from the acquirer to a payment network for processing. Settlement may include the debiting of the issuer by the payment network for transactions involving beneficiaries of the issuer. In some instances, the issuer may pay the acquirer via the payment network. In other instances, the issuer may pay the acquirer directly. Funding may include payment to the merchant from the acquirer for the payment transactions that have been cleared and settled. It will be apparent to persons having skill in the relevant art that the order and/or categorization of the steps discussed above performed as part of payment transaction processing.

System for Processing Automatic Chargeback Requests

FIG. 1 illustrates a system 100 for the automatic processing of chargeback requests upon the receipt of an indication of a product return to be completed by a consumer.

The system 100 may include a consumer 102. The consumer 102 may engage in a payment transaction for the purchase of a product with a merchant 104. As part of the transaction, the consumer 102 may present a payment card or other instrument associated with a payment account to the merchant 104 for payment. The payment account may be associated with the consumer 102 and held by an issuer 106, such as an issuing bank.

The merchant 104 may accept the payment card, may read payment details (e.g., a payment account number) from the payment card, and transmit the payment details along with transaction data (e.g., a transaction amount) to an acquirer 108, such as an acquiring bank. Using methods and systems that will be apparent to persons having skill in the relevant art, the acquirer 108 may generate and submit an authorization request for the payment transaction to a payment network 110. The payment network 110 may then process the payment transaction, which may include requesting approval for the transaction from the issuer 106. The payment network 110 may provide an authorization response to the acquirer 108, which may forward the response to the merchant 104, who may then finalize the transaction based on the authorization response.

Following the transaction, the consumer 102 may discover a defect or other undesired issue with the purchased product and seek to return the product to the merchant 104 and get their money back. In one embodiment, the consumer 102 may contact a processing server 112 and provide an indication that the product is to be returned. The processing server 112, discussed in more detail below, may receive the indication and may automatically generate a chargeback request to initiate a chargeback to the account of the consumer 102 and to be paid by the merchant 104 using methods and systems as discussed herein. In another embodiment, the processing server 112 may receive the indication from the merchant 104, which may initiate the automatic generation of the chargeback request. In such an embodiment, the indication may be transmitted by the merchant 104 upon the return of the product to the merchant 104 by the consumer 102.

In some embodiments, the consumer 102 may submit the request to the processing server 112 via a mobile device 114. The mobile device 114 may be a mobile communication device suitable for performing the functions as disclosed herein such as a cellular phone, smart phone, tablet computer, notebook computer, etc. Of course, another type of computer could be used, such as a desktop computer, kiosk, etc. In one embodiment, the mobile device 114 may include an electronic wallet application. In a further embodiment, the payment transaction for which the consumer 102 is requesting a chargeback may be conducted using the electronic wallet application. In such an embodiment, the electronic wallet application may store data associated with the payment transaction for inclusion in the indication of the product return.

The generated chargeback request may be transmitted from the processing server 112 to one or more entities suitable for the processing and facilitation of the subsequent chargeback, such as the issuer 106, the merchant 104, the acquirer 108, and/or the payment network 110. Methods and systems for processing a chargeback will be apparent to persons having skill in the relevant art. In some embodiments, the processing server 112 may be a part of or operated by on or behalf of the issuer 106 or the payment network 110. The chargeback may be processed, which may result in the consumer 102 getting their money back, and the merchant 104 receiving the returned product.

The methods and systems discussed herein may be advantageous over existing methods and systems as the automatic initiating and transmitting of the chargeback request may result in less interaction necessary with the consumer, thereby increasing consumer use and acceptance in addition to processing time, as well as resulting in less expense and faster processing for the merchant 104, who may still receive the returned product despite or as a result of the chargeback. This may lead to less fraud conducted by nefarious consumers, which may in turn improve the shopping experience for both consumers and merchants, which may experience less residual negative effects from fraudulent chargebacks.

Processing Server

Figure 2:
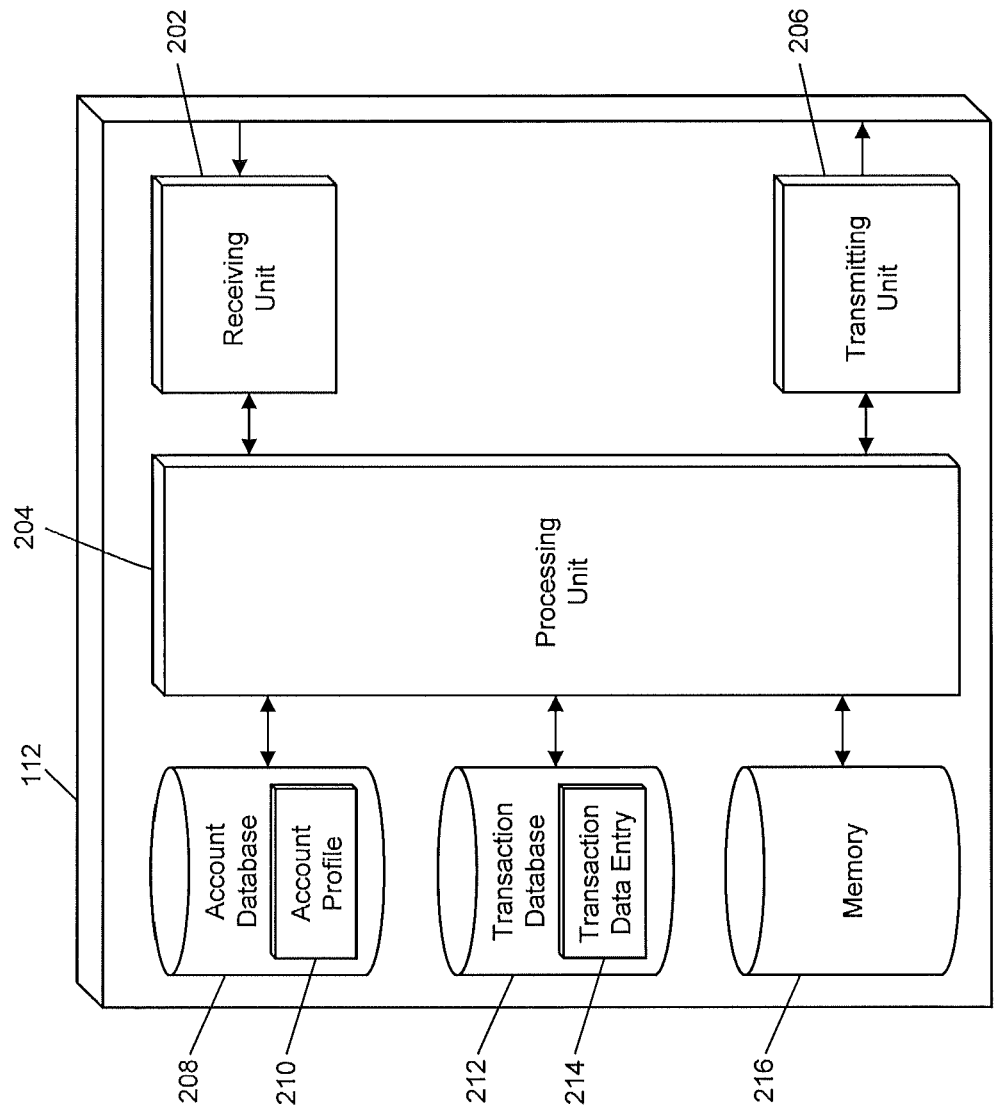
FIG. 2 is a block diagram illustrating the processing server of FIG. 1 for the generation and transmitting of automatic chargeback requests in accordance with exemplary embodiments.

FIG. 2 illustrates an embodiment of the processing server 112 of the system 100. It will be apparent to persons having skill in the relevant art that the embodiment of the processing server 112 illustrated in FIG. 2 is provided as illustration only and may not be exhaustive to all possible configurations of the processing server 112 suitable for performing the functions as discussed herein. For example, the computer system 700 illustrated in FIG. 7 and discussed in more detail below may be a suitable configuration of the processing server 112.

The processing server 112 may include a receiving unit 202. The receiving unit 202 may be configured to receive data over one or more networks via one or more network protocols. The receiving unit 202 may receive an indication of a product return from the mobile device 114, the merchant 104, or other suitable entity. In one embodiment, the indication of a product return may include an account identifier, a product amount (e.g., the portion of the transaction that is attributable to the purchase of the particular product, which might be the entire transaction amount for a single product transaction, as adjusted perhaps for ancillary amounts such as shipping and handling, etc.), and a merchant identifier. In another embodiment, the indication of a product return may include a transaction identifier.

The processing server 112 may also include an account database 208. The account database 208 may include a plurality of account profiles 210. Each account profile 210 may include data related to a payment account that is associated with a consumer 102, including at least an account identifier. The account identifier may be a unique value associated with the account profile 210, such as an account number corresponding to the related payment account, an identification number, or other suitable value as will be apparent to persons having skill in the relevant art.

The processing server 112 may further include a transaction database 212. The transaction database 212 may include a plurality of transaction data entries 214. As discussed in more detail below, each transaction data entry 214 may include data related to a payment transaction involving the merchant 104 and a consumer 102, including at least a transaction identifier, a merchant identifier, and an account identifier corresponding to an account profile 210 in the account database 208.

The processing server 112 may also include a processing unit 204. The processing unit 204 may be configured to identify an account profile 210 or transaction data entry 214 that includes an identifier corresponding to the account identifier or transaction identifier, respectively, included in the received indication of a product return. The processing unit 204 may then generate a chargeback request. The chargeback request may be for a chargeback to be initiated against the merchant 104 corresponding to the merchant identifier included in the received indication and/or the identified transaction data entry 214, and for the benefit of the payment account related to the identified account profile 210.

In some embodiments, the processing unit 204 may include a reason code in the generated chargeback request. The reason code may be one of a plurality of codes used to indicate the basis for the requested chargeback, such as the plurality of codes used by a payment network 110, such as MasterCard® or VISA®. For example, the reason code may indicate merchandise/services not as described, non-receipt of merchandise, defective merchandise, or services not rendered by the merchant 104. In some instances, the indication of a product return may include a reason code to be included in the generated chargeback or include other data that may be used by the processing unit 204 to identify a reason code. For example, the consumer 102 may input an explanation for the product return in the mobile device 114 while submitting the indication of the product return to the processing server 112.

The chargeback request generated by the processing unit 204 may be for a product amount included in the indication of the product return. In some embodiments, the product amount may only be included in an indication submitted to the processing server 112 from the merchant 104. In some instances, the transaction data entries 214 may include product data, including purchase amounts for one or more products purchased in the related payment transaction. In such an instance, the amount included in the generated chargeback request may be the purchase amount of one or more products being returned, which may be indicated in the received indication of the product return. In some cases, the chargeback amount may be the entire transaction amount of the transaction.

The processing server 112 may further include a transmitting unit 206. The transmitting unit 206 may be configured to transmit data over one or more networks via one or more network protocols. The transmitting unit 206 may transmit the chargeback request generated by the processing unit 204 to a third party for processing, such as the payment network 110, the issuer 106, or the merchant 104. In instances where the received indication of a product return may include insufficient information, the transmitting unit 206 may submit a request for additional information from the requestor, such as the merchant 104 or the consumer 102. For example, the consumer 102 may submit an indication of a product return, but fail to indicate the product being returned or the product amount. In such an example, the transmitting unit 206 may submit a request for the product amount or product data to the consumer 102 or the merchant 104.

The processing server 112 may also include a memory 216. The memory 216 may be configured to store any additional data necessary for performing the functions as disclosed herein as will be apparent to persons having skill in the relevant art. For example, the memory 216 may include program code to be executed by the processing unit 204 for performing the functions as disclosed herein. In another example, the memory 216 may include purchase amounts for a plurality of products that may be returned and for which chargeback requests may be generated. In such an example, the processing unit 204 may identify a purchase amount for a product being returned based on a product identifier included in the indication of the product return or in an identified transaction data entry 214.

Additional features and functions as performed by the processing server 112 are discussed in more detail below.

Transaction Database

Figure 3:
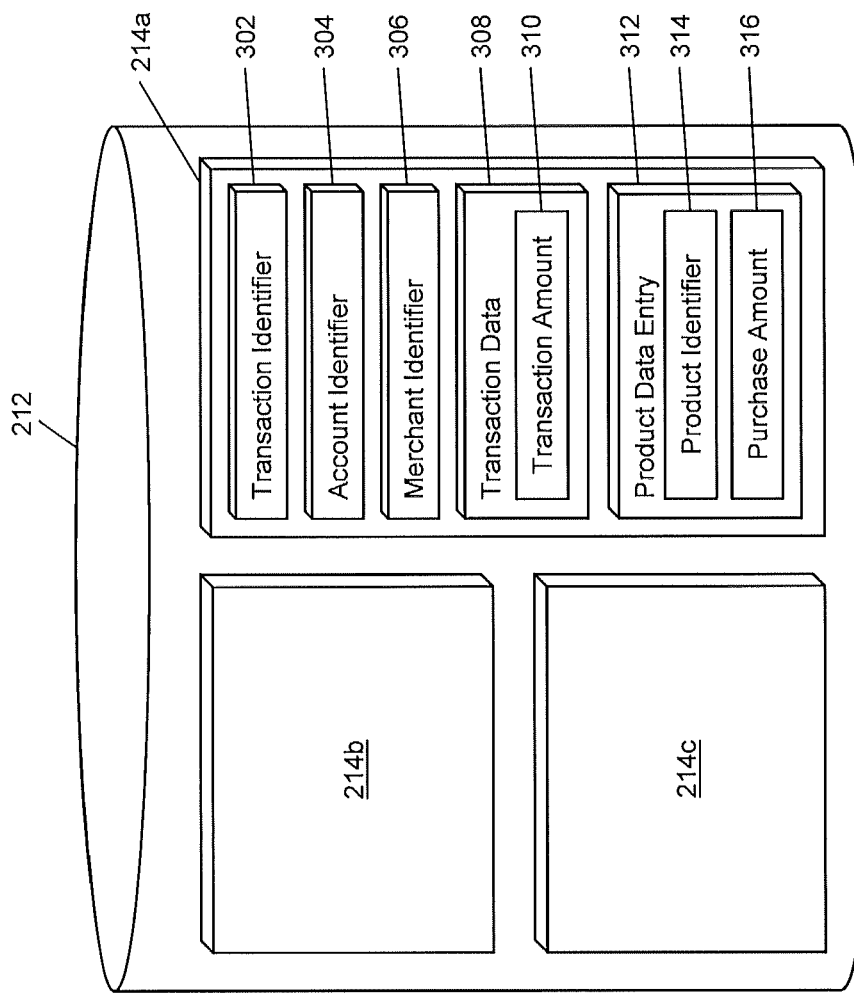
FIG. 3 is a flow diagram illustrating the transaction database of the processing server of FIG. 2 in accordance with exemplary embodiments.

FIG. 3 is an illustration of the transaction database 212 of the processing server 112. As discussed above, the transaction database 212 may include a plurality of transaction data entries 214, illustrated in FIG. 3 as transaction data entries 214a, 214b, and 214c. Each transaction data entry 214 may include data related to a payment transaction including at least a transaction identifier 302, an account identifier 304, and a merchant identifier 306.

The transaction identifier 302 may be a unique value associated with the respective transaction data entry 214 and/or the related payment transaction. The transaction identifier 302 may be an identification number or other value suitable for identification of the respective transaction data entry 214 as will be apparent to persons having skill in the relevant art. In embodiments where the indication of a product return includes a transaction identifier 302, the processing unit 204 may identify the corresponding transaction data entry 214 in the transaction database 212 using the transaction identifier 302.

The account identifier 304 may be an account identifier included in an account profile 210 stored in the account database 208. The account identifier 304 may thereby indicate the payment account, as related to the corresponding account profile 210, used to fund the payment transaction related to the respective transaction data entry 214. In embodiments where the indication of a product return includes a transaction identifier 302, the processing unit 204 may identify an account profile 210 in the account database 208 including the account identifier 304 in the identified transaction data entry 214 that includes the transaction identifier 302. In some embodiments, the account identifier 304 may be a payment account number corresponding to the payment account used to fund the related payment transaction.

The merchant identifier 306 may be a unique value associated with a merchant 104 involved in the related payment transaction, such as a merchant identification number (MID) or other suitable value as will be apparent to persons having skill in the relevant art. In some instances, the merchant identifier 306 may be a payment account number corresponding to a payment account associated with the merchant 104. In such an instance, a generated chargeback request may include the payment account number as the requested source of funds to pay for the chargeback.

In some embodiments, each transaction data entry 214 may further include transaction data 308. The transaction data 308 may include additional data corresponding to the related payment transaction. The additional data may include a time and/or date of the transaction, a geographic location, merchant data, a transaction amount 310, or other suitable data as will be apparent to persons having skill in the relevant art. The transaction amount 310 may be the amount paid by the consumer 102 involved in the related payment transaction to the merchant 104. In some embodiments, the chargeback request generated by the processing unit 204 may include the transaction amount 310 as the amount to be paid by the merchant 104 for the chargeback, or might be for a product amount, and perhaps allow for adjustments, such as reduction for shipping and handling charges.

In some embodiments, each transaction data entry 214 may further include one or more product data entries 312. Each product data entry 312 may include data related to a product purchased in the respective related payment transaction. The product data entry 312 may include at least a product identifier 314 and a purchase amount 316. The product identifier 314 may be a unique value associated with the related product, such as a universal product code, manufacturer part number, stock-keeping unit, international standard book number, European article number, or other suitable value as will be apparent to persons having skill in the relevant art. The purchase amount 316 may be the amount paid for the related product by the consumer 102 in the payment transaction related to the respective transaction data entry 214.

In such an embodiment, the received indication of a product return may include a product identifier 314. The processing unit 204 may be configured to identify a product data entry 312 in the transaction data entry 214 that includes the product identifier 314. The processing unit 204 may then include the purchase amount 316 included in the identified product data entry 312 in the generated chargeback request as the amount to be paid by the merchant 104 for the chargeback. In some instances, the indication of a product return may include multiple product identifiers 314, which may indicate a plurality of products being returned by the consumer 102.

Additional data that may be included in each transaction data entry 214 and suitable for use in performing the functions as disclosed herein will be apparent to persons having skill in the relevant art. In some embodiments, the data included in each transaction data entry 214 may be received by the receiving unit 202 of the processing server 112 from the payment network 110. In other embodiments, the data may be stored in the mobile device 114, such as via the use of an electronic wallet application stored on and executed by the mobile device 114. In such an embodiment, the transaction data entry 214 may be included in or otherwise accompany an indication of a product return originating from the mobile device 114. Additional sources of the data included in each transaction data entry 214 will be apparent to persons having skill in the relevant art.

Process for Generating a Chargeback Request

Figure 4:
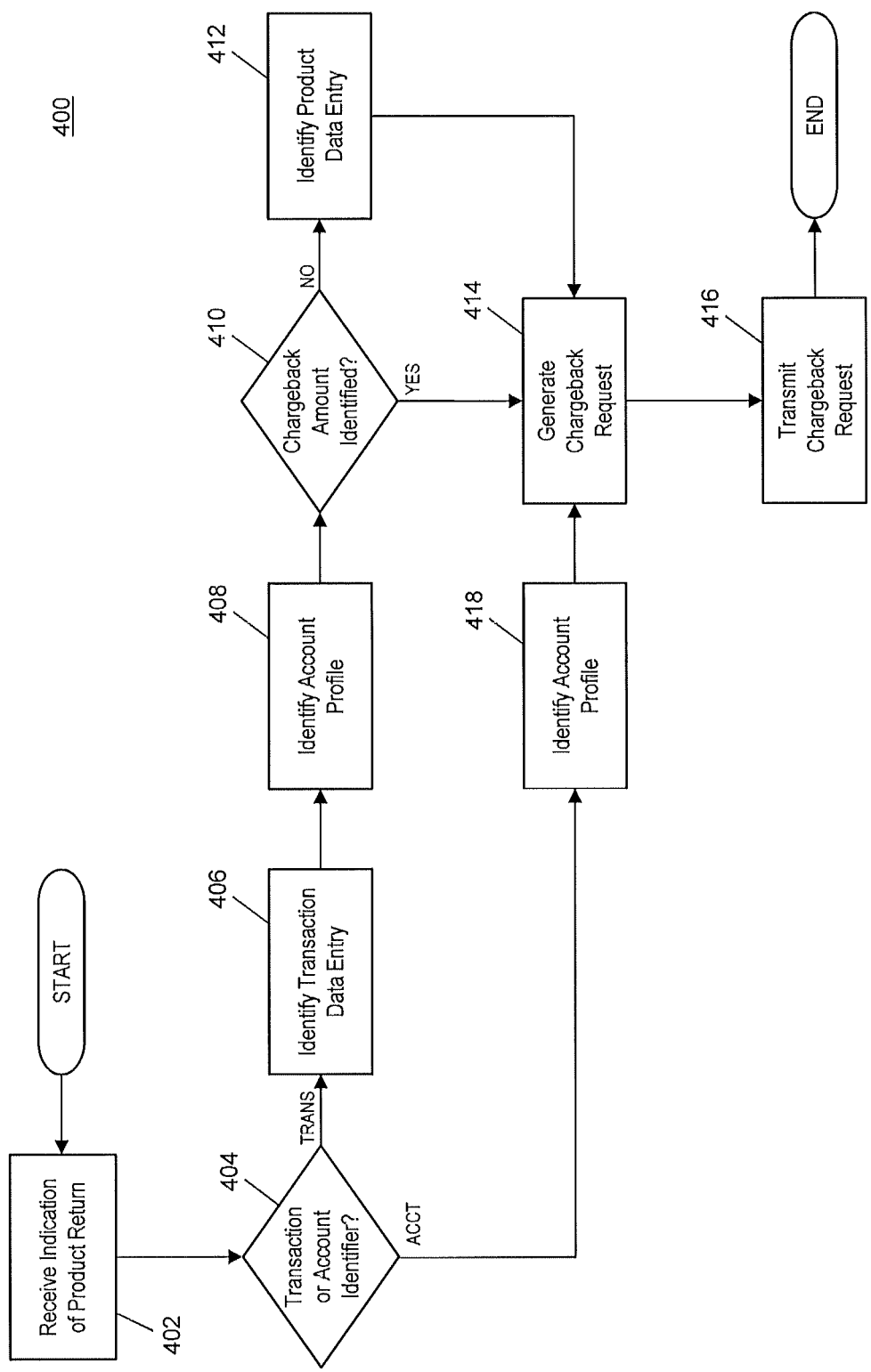
FIG. 4 is a flow diagram illustrating the automatic generation and transmission of a chargeback request by the processing server of FIG. 2 in accordance with exemplary embodiments.

FIG. 4 illustrates a process 400 for the automatic generation of a chargeback request by the processing server 112 upon the receipt of an indication of a product being returned by the consumer 102.

In step 402, the receiving unit 202 of the processing server 112 may receive an indication of a product return. In one embodiment, the indication may include a transaction identifier 302. In another embodiment, the indication may include an account identifier 304, a product amount, and a merchant identifier 306. In step 404, the processing unit 204 of the processing server 112 may identify the data included in the received indication and determine if the indication includes an account identifier 304 or a transaction identifier 302.

If the indication includes a transaction identifier 302, then, in step 406, the processing unit 204 may identify a transaction data entry 214 in the transaction database 212 that includes the transaction identifier 302 included in the received indication of the product return. In step 408, the processing unit 204 may identify an account profile 210 stored in the account database 208 where the included account identifier corresponds to the account identifier 304 in the identified transaction data entry 214.

In step 410, the processing unit 204 may identify if a chargeback amount is included in the received indication of the product return. If no chargeback amount is included, then, in step 412, the processing unit 204 may identify one or more product data entries 312 included in the identified transaction data entry 214 that correspond to products being returned based on one or more product identifiers 314 also included in the indication of the product return. In some embodiments, the processing unit 204 may instead identify a transaction amount 310 included in transaction data 308 included in the identified transaction data entry 214.

In step 414, the processing unit 204 may generate a chargeback request. The chargeback request may include at least the account identifier 304 and the merchant identifier 306 included in the identified transaction data entry 214, as well as the chargeback amount identified in the received indication of product return or identified by the processing unit 204 based on the data included in the identified transaction data entry 214. In step 416, the transmitting unit 206 of the processing server 112 may transmit the chargeback request to a third party for processing of the requested chargeback.

In instances where, in step 404, the processing unit 204 identifies an account identifier 304 included in the indication of the product return, the processing unit 204 may then identify an account profile 210 stored in the account database 208 including the account identifier 304, in step 418. Once the account profile 210 has been identified, the process 400 may proceed to step 414, where the processing unit 204 may generate the chargeback request to include the account identifier 304 and the merchant identifier and product amount included in the received indication. Then, in step 416, the transmitting unit 206 may transmit the generated chargeback request.

Once the chargeback request has been transmitted for processing, the chargeback may be initiated against the merchant 104 based on the merchant identifier 306 included in the chargeback request. The payment account associated with the consumer 102, identified based on the account identifier 304, may be credited the chargeback amount by the issuer 106, and the merchant 104 may be responsible for payment of the chargeback amount back to the issuer 106 or for otherwise addressing the chargeback (e.g., by disputing the chargeback). Methods and systems for the processing of a chargeback will be apparent to persons having skill in the relevant art.

First Exemplary Method for Processing an Automatic Chargeback Request

Figure 5:
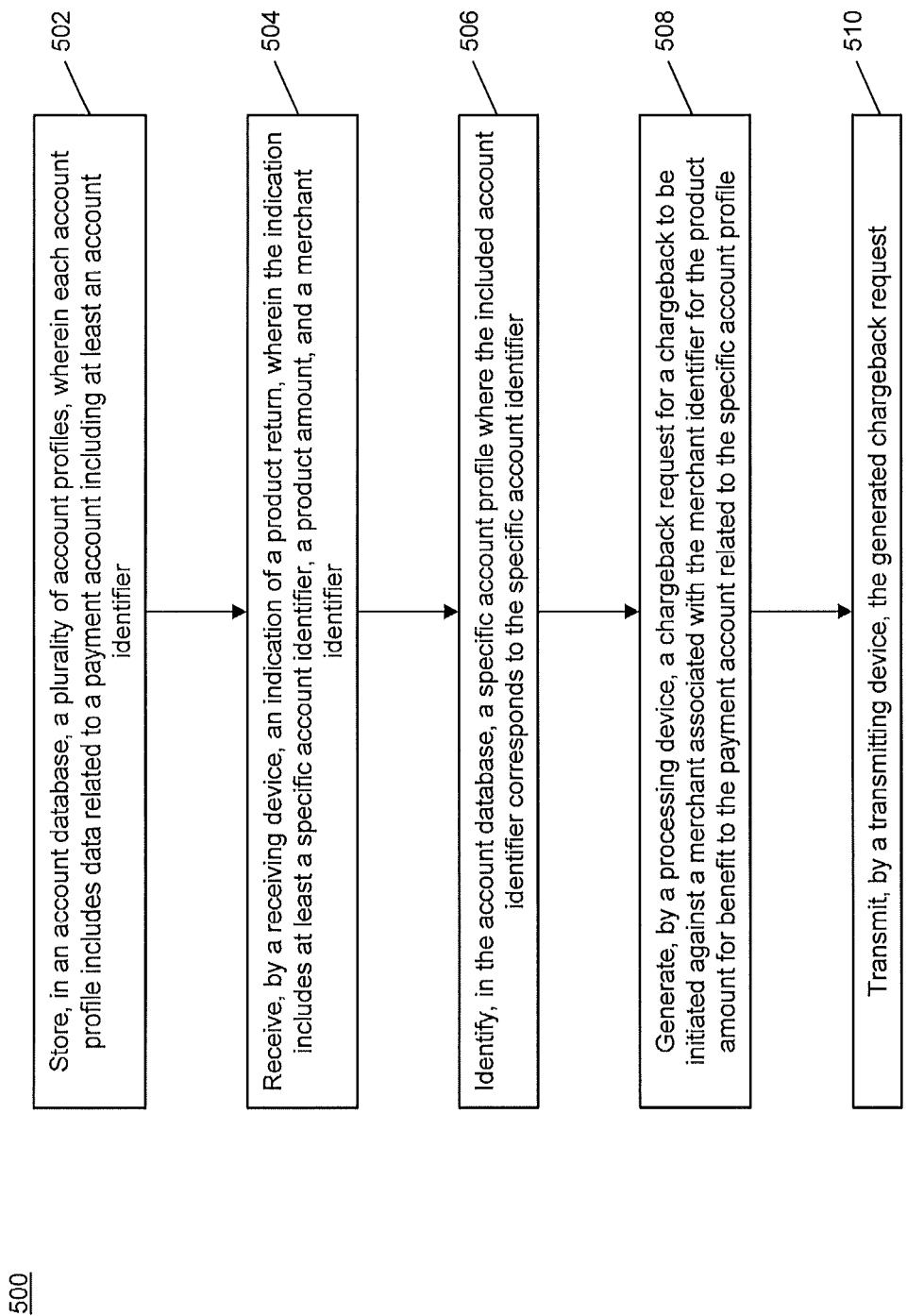
FIGS. 5 and 6 are flow charts illustrating exemplary methods for processing an automatic chargeback request in accordance with exemplary embodiments.

FIG. 5 illustrates a first exemplary method 500 for processing an automatic chargeback request.

In step 502, a plurality of account profiles (e.g., account profiles 210) may be stored in an account database (e.g., the account database 208), wherein each account profile 210 includes data related to a payment account including at least an account identifier (e.g., the account identifier 304).

In step 504, an indication of a product return may be received by a receiving device (e.g., the receiving unit 202), wherein the indication includes at least a specific account identifier, a product amount, and a merchant identifier (e.g., the merchant identifier 306). In one embodiment, the indication of a product return may originate from a merchant associated with the merchant identifier 306. In another embodiment, the indication of a product return may be received from a mobile communication device (e.g., the mobile device 114). In some embodiments, the indication of a product return may further include at least one of: a consumer statement, product data, transaction data, and a reason code.

In step 506, a specific account profile 210 may be identified, in the account database 208, where the included account identifier 304 corresponds to the specific account identifier. In embodiments where the indication of a product return may be received from a mobile communication device 114 or other computing device, the mobile communication device 114 may be associated with the specific account profile 210.

In step 508, a chargeback request may be generated, by a processing device (e.g., the processing unit 204), for a chargeback to be initiated against a merchant (e.g., the merchant 104) associated with the merchant identifier 306 for the product amount for benefit to the payment account related to the specific account profile 210. In one embodiment, the chargeback request may include a reason code indication at least one of: merchandise/services not as described, non-receipt of merchandise, defective merchandise, and services not rendered.

In step 510, the generated chargeback request may be transmitted by a transmitting device (e.g., the transmitting unit 206). In one embodiment, the generated chargeback request may be transmitted to the merchant 104 associated with the merchant identifier 306. In another embodiment, the generated chargeback request may be transmitted to an issuer (e.g., the issuer 106) associated with the payment account related to the specific account profile 210.

Second Exemplary Method for Processing an Automatic Chargeback Request

Figure 6:
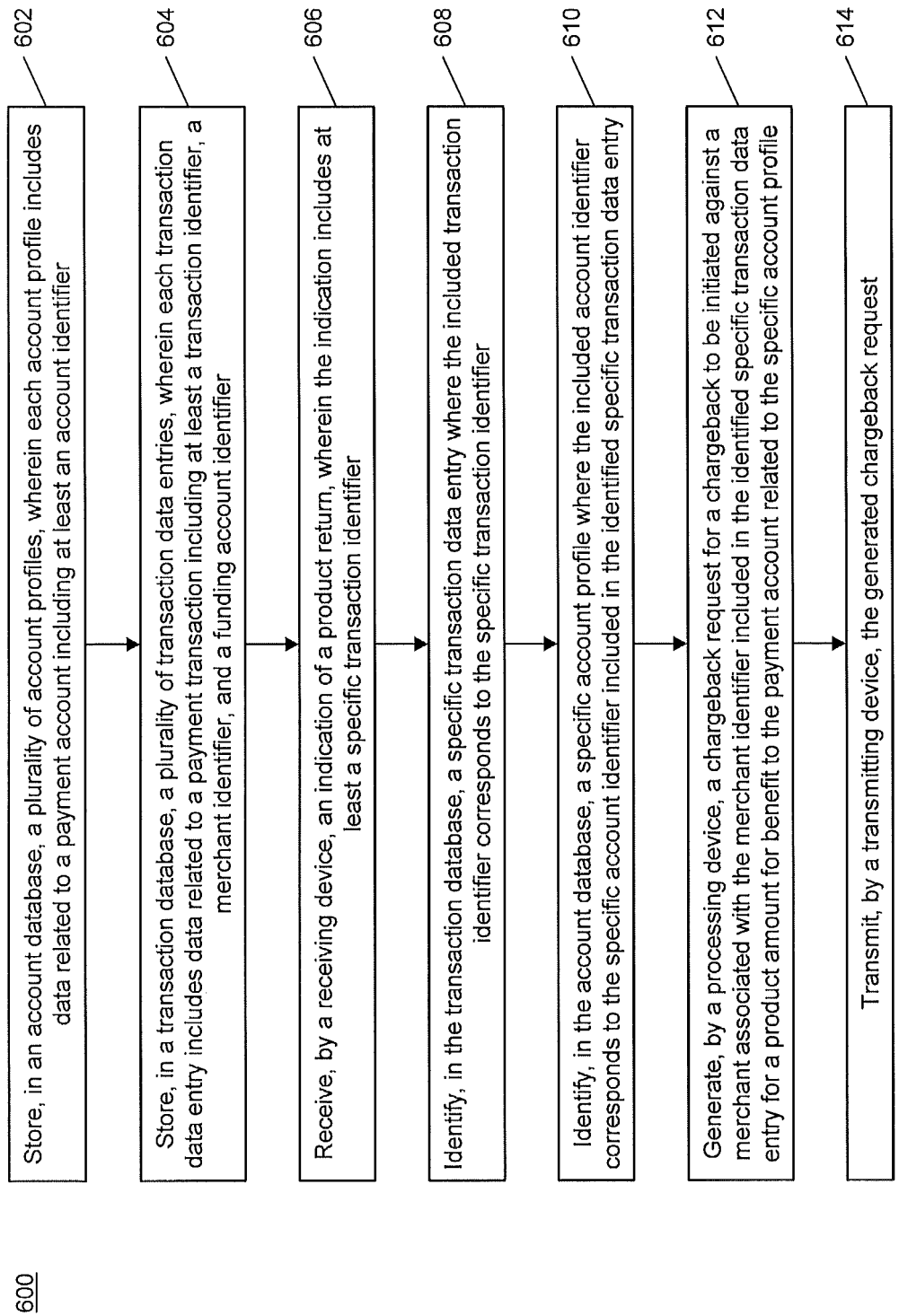

FIG. 6 illustrates a second exemplary method 600 for processing an automatic chargeback request.

In step 602, a plurality of account profiles (e.g., account profiles 210) may be stored in an account database (e.g., the account database 208), wherein each account profile 210 includes data related to a payment account including at least an account identifier. In step 604, a plurality of transaction data entries (e.g., transaction data entries 214) may be stored in a transaction database (e.g., the transaction database 212), wherein each transaction data entry 214 includes data related to a payment transaction including at least a transaction identifier (e.g., the transaction identifier 302), a merchant identifier (e.g., the merchant identifier 306), and a funding account identifier (e.g., the account identifier 304).

In step 606, an indication of a product return may be received by a receiving device (e.g., the receiving unit 202), wherein the indication includes at least a specific transaction identifier. In one embodiment, the indication of a product return may originate from a merchant associated with the merchant identifier 306. In another embodiment, the indication of a product return may be received from a mobile communication device (e.g., the mobile device 114). In some embodiments, the indication of a product return may further include at least one of: a consumer statement and a reason code.

In step 608, a specific transaction data entry 214 may be identified, in the transaction database 212, where the included transaction identifier 302 corresponds to the specific transaction identifier. In step 610, a specific account profile 210 may be identified, in the account database 208, where the included account identifier corresponds to the funding account identifier 304 included in the identified specific transaction data entry 214. In embodiments where the indication of a product return may be received from a mobile communication device 114, the mobile communication device 114 may be associated with the specific account profile 210.

In step 612, a chargeback request may be generated, by a processing device (e.g., the processing unit 204), for a chargeback to be initiated against a merchant (e.g., the merchant 104) associated with the merchant identifier 306 included in the identified specific transaction data entry 214 for a product amount for benefit to the payment account related to the specific account profile 210. In some embodiments, the chargeback request may include a reason code indication at least one of: merchandise/services not as described, non-receipt of merchandise, defective merchandise, and services not rendered. In one embodiment, the indication of a product return may include the product amount. In another embodiment, each transaction data entry 214 may further include a transaction amount, and the product amount may correspond to the transaction amount included in the identified specific transaction data entry 214.

In one embodiment, each transaction data entry 214 may further include one or more product data entries (e.g., product data entries 312), each product data entry 312 including data related to a product purchased in the related payment transaction including at least a product identifier (e.g., the product identifier 314) and a purchase amount (e.g., the purchase amount 316). In a further embodiment, the indication of a product return may further include a specific product identifier, and the product amount included in the generated chargeback request may correspond to the purchase amount included in a specific product data entry 312 included in the specific transaction data entry 214 where the included product identifier 314 corresponds to the specific product identifier.

In step 614, the generated chargeback request may be transmitted, by a transmitting device (e.g., the transmitting unit 206).

Computer System Architecture

Figure 7:
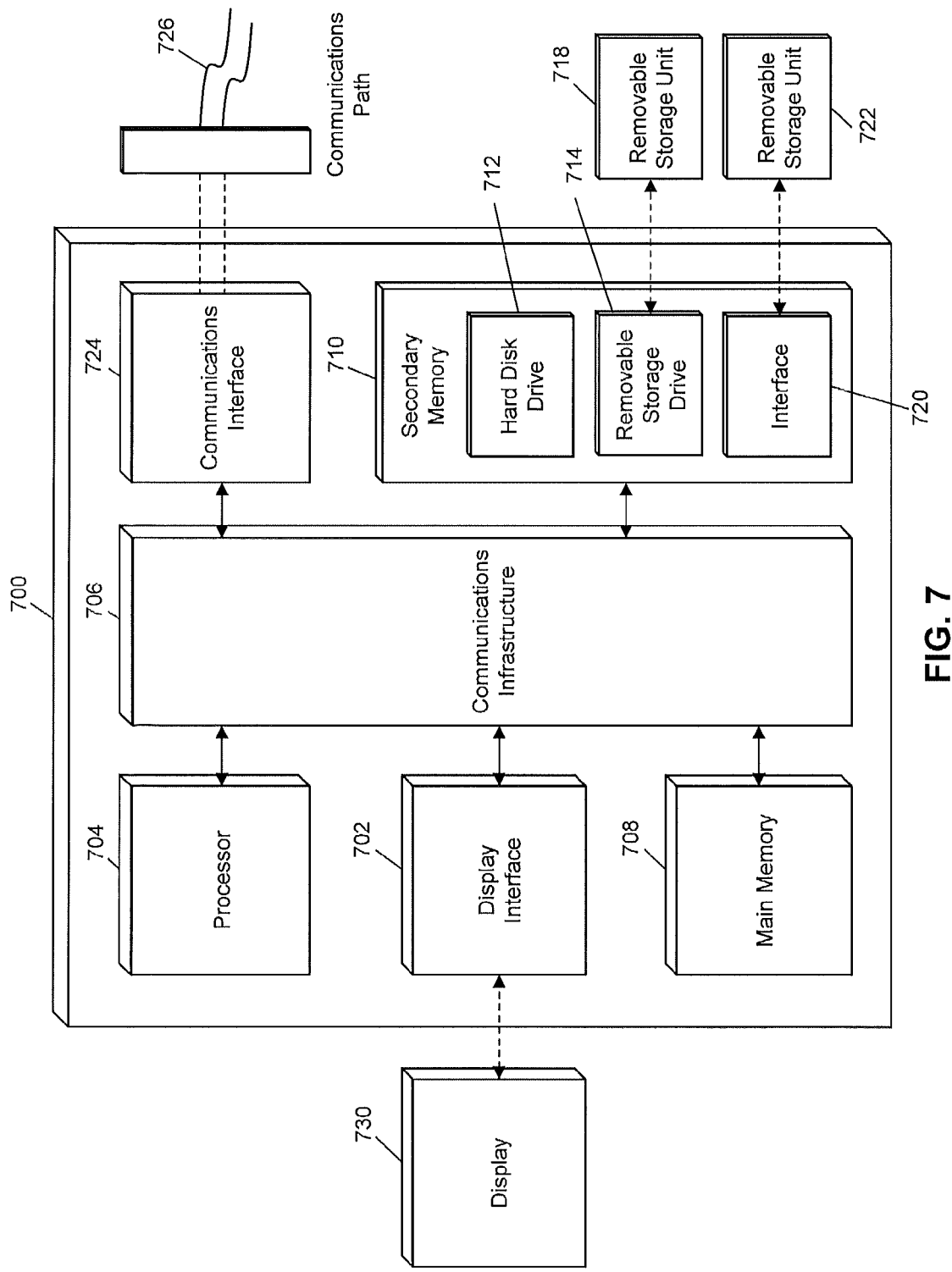
FIG. 7 is a block diagram illustrating a computer system architecture in accordance with exemplary embodiments.

FIG. 7 illustrates a computer system 700 in which embodiments of the present disclosure, or portions thereof, may be implemented as computer-readable code. For example, the processing server 112 of FIG. 1 may be implemented in the computer system 700 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 4-6.

If programmable logic is used, such logic may execute on a commercially available processing platform or a special purpose device. A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 718, a removable storage unit 722, and a hard disk installed in hard disk drive 712.

Various embodiments of the present disclosure are described in terms of this example computer system 700. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor 704 may be a special purpose or a general purpose processor device. The processor 704 may be connected to a communications infrastructure 706, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 700 may also include a main memory 708 (e.g., random access memory, read-only memory, etc.), and may also include a secondary memory 710. The secondary memory 710 may include the hard disk drive 712 and a removable storage drive 714, such as a floppy disk drive, a magnetic tape drive, an optical disk drive, a flash memory, etc.

The removable storage drive 714 may read from and/or write to the removable storage unit 718 in a well-known manner. The removable storage unit 718 may include a removable storage media that may be read by and written to by the removable storage drive 714. For example, if the removable storage drive 714 is a floppy disk drive or universal serial bus port, the removable storage unit 718 may be a floppy disk or portable flash drive, respectively. In one embodiment, the removable storage unit 718 may be non-transitory computer readable recording media.

In some embodiments, the secondary memory 710 may include alternative means for allowing computer programs or other instructions to be loaded into the computer system 700, for example, the removable storage unit 722 and an interface 720. Examples of such means may include a program cartridge and cartridge interface (e.g., as found in video game systems), a removable memory chip (e.g., EEPROM, PROM, etc.) and associated socket, and other removable storage units 722 and interfaces 720 as will be apparent to persons having skill in the relevant art.

Data stored in the computer system 700 (e.g., in the main memory 708 and/or the secondary memory 710) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 700 may also include a communications interface 724. The communications interface 724 may be configured to allow software and data to be transferred between the computer system 700 and external devices. Exemplary communications interfaces 724 may include a modem, a network interface (e.g., an Ethernet card), a communications port, a PCMCIA slot and card, etc. Software and data transferred via the communications interface 724 may be in the form of signals, which may be electronic, electromagnetic, optical, or other signals as will be apparent to persons having skill in the relevant art. The signals may travel via a communications path 726, which may be configured to carry the signals and may be implemented using wire, cable, fiber optics, a phone line, a cellular phone link, a radio frequency link, etc.

Computer program medium and computer usable medium may refer to memories, such as the main memory 708 and secondary memory 710, which may be memory semiconductors (e.g., DRAMs, etc.). These computer program products may be means for providing software to the computer system 700. Computer programs (e.g., computer control logic) may be stored in the main memory 708 and/or the secondary memory 710. Computer programs may also be received via the communications interface 724. Such computer programs, when executed, may enable computer system 700 to implement the present methods as discussed herein. In particular, the computer programs, when executed, may enable processor device 704 to implement the methods illustrated by FIGS. 4-6, as discussed herein. Accordingly, such computer programs may represent controllers of the computer system 700. Where the present disclosure is implemented using software, the software may be stored in a computer program product and loaded into the computer system 700 using the removable storage drive 714, interface 720, and hard disk drive 712, or communications interface 724.

Techniques consistent with the present disclosure provide, among other features, systems and methods for processing automatic chargeback requests. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for processing an automatic chargeback request, comprising:
storing, in an account database, a plurality of account profiles, wherein each account profile includes data related to a payment account including at least an account identifier;

receiving, by a receiving device, an indication of a product return, wherein the indication includes at least a specific account identifier, a product amount, and a merchant identifier;

identifying, in the account database, a specific account profile where the included account identifier corresponds to the specific account identifier;

generating, by a processing device, a chargeback request for a chargeback to be initiated against a merchant associated with the merchant identifier for the product amount for benefit to the payment account related to the specific account profile; and transmitting, by a transmitting device, the generated chargeback request.

2. The method of claim 1, wherein the indication of a product return originates from the merchant associated with the merchant identifier.

3. The method of claim 1, wherein the indication of a product return is received from a mobile communication device associated with the specific account profile.

4. The method of claim 1, wherein the chargeback request includes a reason code indicating one of: merchandise/services not as described, non-receipt of merchandise, defective merchandise, and services not rendered.

5. The method of claim 1, wherein the generated chargeback request is transmitted to the merchant associated with the merchant identifier.

6. The method of claim 1, wherein the indication of a product return includes at least one of: a consumer statement, product data, transaction data, and a reason code.

7. A method for processing an automatic chargeback request, comprising:

storing, in an account database, a plurality of account profiles, wherein each account profile includes data related to a payment account including at least an account identifier;

storing, in a transaction database, a plurality of transaction data entries, wherein each transaction data entry includes data related to a payment transaction including at least a transaction identifier, a merchant identifier, and a funding account identifier;

receiving, by a receiving device, an indication of a product return, wherein the indication includes at least a specific transaction identifier;

identifying, in the transaction database, a specific transaction data entry where the included transaction identifier corresponds to the specific transaction identifier;

identifying, in the account database, a specific account profile where the included account identifier corresponds to the funding account identifier included in the identified specific transaction data entry;

generating, by a processing device, a chargeback request for a chargeback to be initiated against a merchant associated with the merchant identifier included in the identified specific transaction data entry for a product amount for benefit to the payment account related to the specific account profile; and transmitting, by a transmitting device, the generated chargeback request.

8. The method of claim 7, wherein the indication of a product return further includes the product amount.

9. The method of claim 7, wherein
each transaction data entry further includes a transaction amount, and
the product amount corresponds to the transaction amount included in the identified specific transaction data entry.

10. The method of claim 7, wherein
each transaction data entry further includes one or more product data entries, each product data entry includes data related to a product purchased in the related payment transaction including at least a product identifier and a purchase amount,
the indication of a product return further includes a specific product identifier, and
the product amount corresponds to the purchase amount included in a specific product data entry included in the identified specific transaction data entry where the included product identifier corresponds to the specific product identifier.

11. The method of claim 7, wherein the indication of a product return originates from the merchant associated with the merchant identifier.

12. The method of claim 7, wherein the indication of a product return is received from a mobile communication device associated with the specific account profile.

13. The method of claim 7, wherein the chargeback request includes a reason code indicating one of: merchandise/services not as described, non-receipt of merchandise, defective merchandise, and services not rendered.

14. The method of claim 7, wherein the generated chargeback request is transmitted to the merchant associated with the merchant identifier.

15. The method of claim 7, wherein the indication of a product return includes at least one of: a consumer statement and a reason code.

16. A system for processing an automatic chargeback request, comprising:

an account database configured to store a plurality of account profiles, wherein each account profile includes data related to a payment account including at least an account identifier;

a receiving device configured to receive an indication of a product return, wherein the indication includes at least a specific account identifier, a product amount, and a merchant identifier;

a processing device configured to
identify, in the account database, a specific account profile where the included account identifier corresponds to the specific account identifier, and
generate a chargeback request for a chargeback to be initiated against a merchant associated with the merchant identifier for the product amount for benefit to the payment account related to the specific account profile; and a transmitting device configured to transmit the generated chargeback request.

17. The system of claim 16, wherein the indication of a product return originates from the merchant associated with the merchant identifier.

18. The system of claim 16, wherein the indication of a product return is received from a mobile communication device associated with the specific account profile.

19. The system of claim 16, wherein the chargeback request includes a reason code indicating one of: merchandise/services not as described, non-receipt of merchandise, defective merchandise, and services not rendered.

20. The system of claim 16, wherein the generated chargeback request is transmitted to the merchant associated with the merchant identifier.

21. The system of claim 16, wherein the indication of a product return includes at least one of: a consumer statement, product data, transaction data, and a reason code.

22. A system for processing an automatic chargeback request, comprising:
- an account database configured to store a plurality of account profiles, wherein each account profile includes data related to a payment account including at least an account identifier;
- a transaction database configured to store a plurality of transaction data entries, wherein each transaction data entry includes data related to a payment transaction including at least a transaction identifier, a merchant identifier, and a funding account identifier;
- a receiving device configured to receive an indication of a product return, wherein the indication includes at least a specific transaction identifier;
- a processing device configured to
  - identify, in the transaction database, a specific transaction data entry where the included transaction identifier corresponds to the specific transaction identifier,
  - identify, in the account database, a specific account profile where the included account identifier corresponds to the funding account identifier included in the identified specific transaction data entry, and
  - generate a chargeback request for a chargeback to be initiated against a merchant associated with the merchant identifier included in the identified specific transaction data entry for a product amount for benefit to the payment account related to the specific account profile; and
- a transmitting device configured to transmit the generated chargeback request.

23. The system of claim 22, wherein the indication of a product return further includes the product amount.

24. The system of claim 22, wherein
- each transaction data entry further includes a transaction amount, and
- the product amount corresponds to the transaction amount included in the identified specific transaction data entry.

25. The system of claim 22, wherein
- each transaction data entry further includes one or more product data entries, each product data entry includes data related to a product purchased in the related payment transaction including at least a product identifier and a purchase amount,
- the indication of a product return further includes a specific product identifier, and
- the product amount corresponds to the purchase amount included in a specific product data entry included in the identified specific transaction data entry where the included product identifier corresponds to the specific product identifier.

26. The system of claim 22, wherein the indication of a product return originates from the merchant associated with the merchant identifier.

27. The system of claim 22, wherein the indication of a product return is received from a mobile communication device associated with the specific account profile.

28. The system of claim 22, wherein the chargeback request includes a reason code indicating one of: merchandise/services not as described, non-receipt of merchandise, defective merchandise, and services not rendered.

29. The system of claim 22, wherein the generated chargeback request is transmitted to the merchant associated with the merchant identifier.

30. The system of claim 22, wherein the indication of a product return includes at least one of: a consumer statement and a reason code.

* * * * *